United States Patent
Field et al.

(10) Patent No.: US 9,407,654 B2
(45) Date of Patent: Aug. 2, 2016

(54) PROVIDING MULTI-LEVEL PASSWORD AND PHISHING PROTECTION

(71) Applicant: Microsoft Technology Licensing, LLC, Redmond, WA (US)

(72) Inventors: Scott A. Field, Redmond, WA (US); Ellen E. Cram, Seattle, WA (US); Julian Federico Gonzalez, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 134 days.

(21) Appl. No.: 14/220,346

(22) Filed: Mar. 20, 2014

(65) Prior Publication Data
US 2015/0271197 A1    Sep. 24, 2015

(51) Int. Cl.
*G06F 11/00* (2006.01)
*H04L 29/06* (2006.01)
*G06F 21/57* (2013.01)
*G06F 21/12* (2013.01)

(52) U.S. Cl.
CPC .......... *H04L 63/1433* (2013.01); *G06F 21/128* (2013.01); *G06F 21/577* (2013.01); *H04L 63/1483* (2013.01); *G06F 2221/034* (2013.01)

(58) Field of Classification Search
CPC ............ H04L 63/1433; H04L 63/1483; G06F 21/577; G06F 2221/034; G06F 21/128
USPC ......................... 726/26, 27, 21–25
See application file for complete search history.

(56) References Cited

U.S. PATENT DOCUMENTS

| | | | | |
|---|---|---|---|---|
| 7,237,114 | B1* | 6/2007 | Rosenberg | G06F 21/6209 705/67 |
| 7,392,534 | B2* | 6/2008 | Lu | G06F 21/42 713/182 |
| 7,478,434 | B1* | 1/2009 | Hinton | G06F 17/3089 726/27 |
| 7,627,896 | B2* | 12/2009 | Herrmann | H04L 63/0823 726/14 |
| 7,681,234 | B2 | 3/2010 | Florencio et al. | |
| 8,150,777 | B1* | 4/2012 | Tadayon | G06Q 30/0201 705/30 |
| 8,225,385 | B2* | 7/2012 | Chow | H04L 63/08 713/168 |
| 8,321,934 | B1 | 11/2012 | Cooley et al. | |

(Continued)

OTHER PUBLICATIONS

"OWASP Testing Guide 2008 V3.0", Published on: Jan. 1, 2008, Available at: https://www.owasp.org/images/5/56/OWASP_Testing_Guide_v3.pdf.

(Continued)

*Primary Examiner* — Thu Ha Nguyen
(74) *Attorney, Agent, or Firm* — Aneesh Mehta; Sade Fashokun; Micky Minhas

(57) ABSTRACT

Embodiments described herein are directed to preventing development of insecure web pages, preventing deployment of insecure web pages and to preventing access to insecure web pages. In one embodiment, a computer system accesses a web page that includes one or more web elements. The computer system then determines that the web page includes at least one element that requests user authentication and determines whether various specified secure protocols have been implemented on the web page. Then, if the specified secure protocols have not been implemented on the web page, the computer system displays a warning or error indicating that the web page is insecure.

21 Claims, 5 Drawing Sheets

(56) References Cited

U.S. PATENT DOCUMENTS

| | | | |
|---|---|---|---|
| 8,566,726 B2 | 10/2013 | Dixon et al. | |
| 8,627,422 B2* | 1/2014 | Hawkes | H04L 63/166 380/255 |
| 8,682,979 B2* | 3/2014 | LeVasseur | G06Q 10/107 709/204 |
| 8,745,718 B1* | 6/2014 | Dufel | H04L 63/0807 713/155 |
| 9,270,663 B2* | 2/2016 | Kravitz | H04L 9/006 |
| 2002/0069366 A1* | 6/2002 | Schoettger | H04L 12/4633 726/11 |
| 2003/0042301 A1* | 3/2003 | Rajasekaran | G06Q 20/02 235/380 |
| 2003/0159070 A1* | 8/2003 | Mayer | G06F 21/53 726/22 |
| 2005/0086298 A1* | 4/2005 | Campbell | G06Q 40/00 709/203 |
| 2006/0059543 A1* | 3/2006 | Knowles | H04L 41/12 726/4 |
| 2006/0143700 A1* | 6/2006 | Herrmann | H04L 63/0823 726/14 |
| 2006/0253446 A1* | 11/2006 | Leong | G06F 17/30867 |
| 2009/0216795 A1 | 8/2009 | Cohen et al. | |
| 2011/0019587 A1* | 1/2011 | Wang | H04L 63/0823 726/14 |
| 2011/0251992 A1* | 10/2011 | Bethlehem | H04L 12/2863 707/610 |
| 2012/0005098 A1* | 1/2012 | Gross | G06F 21/31 705/50 |
| 2012/0324568 A1* | 12/2012 | Wyatt | G06F 21/51 726/13 |
| 2013/0298209 A1* | 11/2013 | Targali | H04L 63/0815 726/6 |
| 2014/0047546 A1 | 2/2014 | Sidagni | |
| 2015/0040229 A1* | 2/2015 | Chan | G06F 21/577 726/25 |
| 2015/0101019 A1* | 4/2015 | Yeung | H04W 12/06 726/4 |
| 2015/0319102 A1* | 11/2015 | Esdaile | H04L 67/22 709/225 |
| 2016/0050225 A1* | 2/2016 | Carpenter | H04L 63/1433 726/25 |

OTHER PUBLICATIONS

"International Search Report and Written Opinion Issued in PCT Patent Application No. PCT/US2015/021123" Mailed Date: Jun. 12, 2015, 11 Pages.

"This Page has Insecure Content", Published on: Sep. 20, 2013, Available at: https://support.google.com/chrome/answer/1342714?hl=en.

"InsecurePasswords", Published on: Nov. 13, 2013, Available at: https://developer.mozilla.org/en-/docs/Security/InsecurePasswords.

Lopes, et al., "Poster: Preventing SSL stripping Attack using Visual Security Cues", Retrieved on: Dec. 10, 2013, Available at: http://cups.cs.cmu.edu/soups/2011/posters/soups_posters-Lopes.pdf.

"Bug 762593—Add warning/error Message to Web Console when the Page Includes Insecure Password fields", Published on: Jul. 3, 2013, Available at: https://bugzilla.mozilla.org/show_bug.cgi?id=762593.

Second Written Opinion Issued in PCT Application No. PCT/US2015/021123, Mailed Date: Feb. 5, 2016, 6 Pages.

* cited by examiner

PROVIDING MULTI-LEVEL PASSWORD AND PHISHING PROTECTION

BACKGROUND

Computers and the internet allow users to access vast amounts of information. Some of this information is private and is intended only for use by specified users. For example, banking information, email, insurance information, healthcare and other such types of private information are often stored in secure servers. These secure severs are typically only accessible using appropriate login credentials and one of a variety of authentication schemes. These authentication schemes may include, for example, digital certificates sent over secure protocols. In this manner, authorized users can access their private information, while unauthorized users cannot.

BRIEF SUMMARY

Embodiments described herein are directed to preventing development of insecure web pages, preventing deployment of insecure web pages and to preventing access to insecure web pages. In one embodiment, a computer system accesses a web page that includes one or more web elements. The computer system then determines that the web page includes at least one element that requests user authentication and determines whether various specified secure protocols have been implemented on the web page. Then, if the specified secure protocols have not been implemented on the web page, the computer system displays a warning or error indicating that the web page is insecure.

In another embodiment, a computer system initiates a software application configured to determine whether specified secure protocols have been implemented on web pages that require authentication. The computer system then scans various network-exposed endpoints with the initiated software application to determine whether specified secure protocols have been implemented on web pages that require authentication. The computer system further determines, from the scan, that secure protocols have not been implemented on at least one of the network-exposed endpoints, and generates a warning indicating that at least one network-exposed endpoint is insecure.

In yet another embodiment, a computer system accesses real-time web traffic data and determines that web page data for at least one identified web page includes an element that requests user authentication. The computer system determines whether various specified secure protocols have been implemented on the identified web page and if the specified secure protocols have not been implemented on the web page, displays a warning indicating that the web page is insecure.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Embodiments described herein are directed to preventing development of insecure web pages, preventing deployment of insecure web pages and to preventing access to insecure web pages. In one embodiment, a computer system accesses a web page that includes one or more web elements. The computer system then determines that the web page includes at least one element that requests user authentication and determines whether various specified secure protocols have been implemented on the web page. Then, if the specified secure protocols have not been implemented on the web page, the computer system displays a warning or error indicating that the web page is insecure.

In another embodiment, a computer system initiates a software application configured to determine whether specified secure protocols have been implemented on web pages that require authentication. The computer system then scans various network-exposed endpoints with the initiated software application to determine whether specified secure protocols have been implemented on web pages that require authentication. The computer system further determines, from the scan, that secure protocols have not been implemented on at least one of the network-exposed endpoints, and generates a warning indicating that at least one network-exposed endpoint is insecure.

In yet another embodiment, a computer system accesses real-time web traffic data and determines that web page data for at least one identified web page includes an element that requests user authentication. The computer system determines whether various specified secure protocols have been implemented on the identified web page and if the specified secure protocols have not been implemented on the web page, displays a warning indicating that the web page is insecure.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. A computing system may be distributed over a network environment and may include multiple constituent computing systems.

Figure 1:
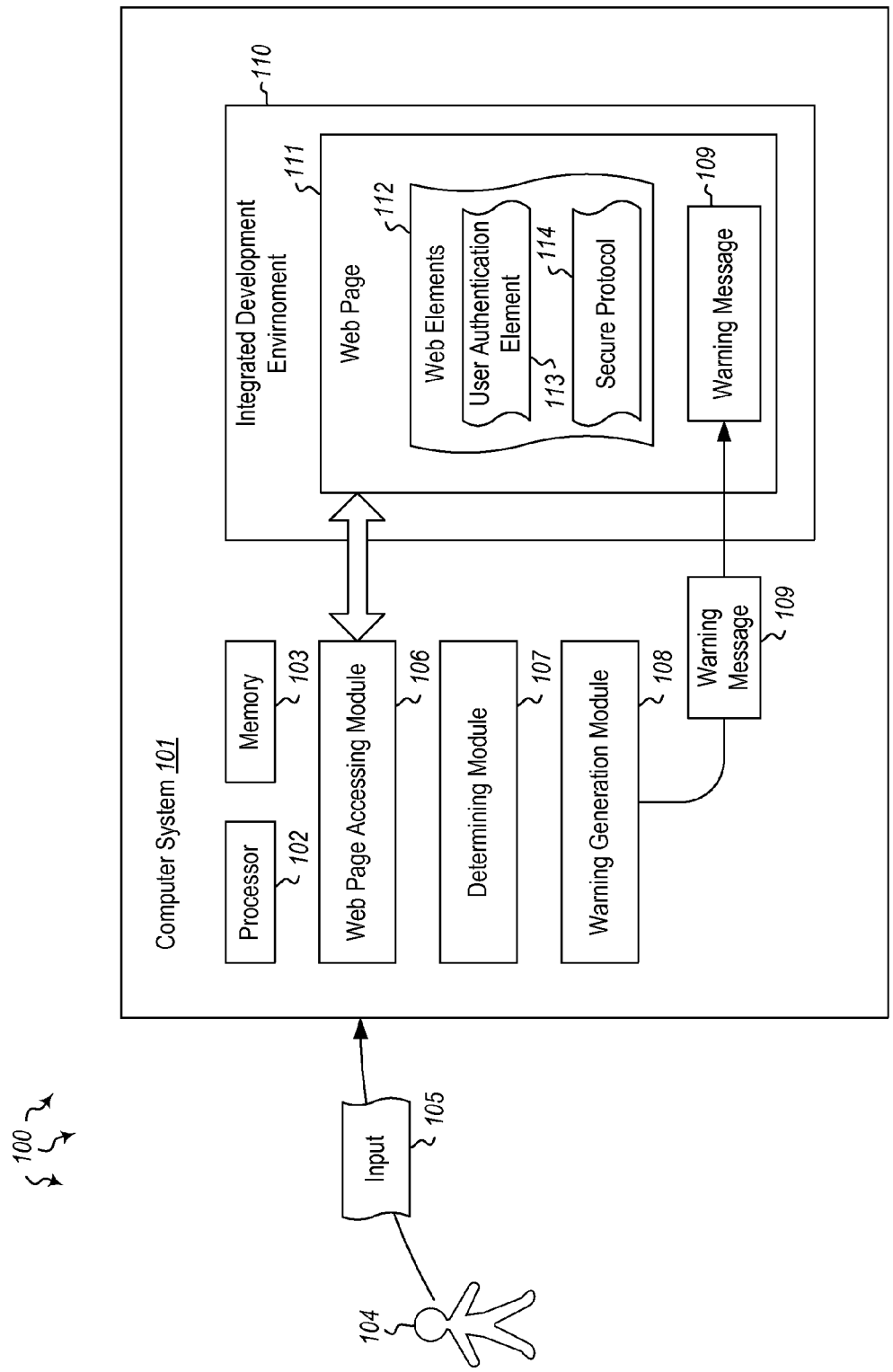
FIG. 1 illustrates a computer architecture in which embodiments described herein may operate including preventing development of insecure web pages.

As illustrated in FIG. 1, a computing system 101 typically includes at least one processing unit 102 and memory 103. The memory 103 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 103 of the computing system 101. Computing system 101 may also contain communication channels that allow the computing system 101 to communicate with other message processors over a wired or wireless network.

Embodiments described herein may comprise or utilize a special-purpose or general-purpose computer system that includes computer hardware, such as, for example, one or more processors and system memory, as discussed in greater detail below. The system memory may be included within the overall memory 103. The system memory may also be referred to as "main memory", and includes memory locations that are addressable by the at least one processing unit 102 over a memory bus in which case the address location is asserted on the memory bus itself. System memory has been traditionally volatile, but the principles described herein also apply in circumstances in which the system memory is partially, or even fully, non-volatile.

Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which at least one embodiment may be employed. Computer architecture 100 includes computer system 101. Computer system 101 may be any type of local or distributed computer system, including a cloud computing system. The computer system includes various modules for performing a variety of different functions. For instance, the web page accessing module 106 accesses web pages such as web page 111. The web page may be displayed in an integrated development environment (IDE) 110 as shown in FIG. 1, or may be shown in a variety of different applications including internet browsers, mobile device applications ("apps") or other types of applications. The web page accessing module 106 may access the web pages within the same computer system (i.e. 101, as shown in FIG. 1) or remotely on different computer systems (over a wired or wireless connection, for example).

The web page itself 111 may include different elements 112. The web elements may include, but are not limited to, text, images, forms, multimedia content, flash content, shopping cart functionality, authentication elements 113 or other types of web elements 112. Each web element is incorporated in the web page 111 according to the web page's underlying coding or scripting. Each element may have its own set of implementation files or application programming interfaces (APIs). Each web element may also be introduced or called in a certain manner. In some cases, the method for invoking or implementing an element is standard across internet browsers to allow for conformity when rendering web pages.

In some cases, certain web elements 112 may implement user authentication. Such elements are referred to herein as "user authentication elements". These elements may implement some type of authentication scheme to allow a user (e.g. 104) to access information that is not publicly available. For example, a banking web site may provide a user authentication element such as user name and password fields. These fields within the web page allow users to authenticate to the bank (i.e. to the bank's servers) and access private information that is only available to the user once they are logged in. Reputable banks or other companies that provide user accounts accessible via authentication typically implement secure protocols. These secure protocols are to be implemented between the web page and the back end servers, and provide security to the transfer so that, for example, the user's user name and password are not transferred in the clear.

Secure protocols (114) such as secure sockets layer (SSL) or transport layer security (TLS) are cryptographic protocols that encrypt and securely transfer data from one node to another. Implementing these secure protocols adds processing overhead to data transfers, as data must be encrypted and decrypted before and after being transferred, respectively. Moreover, in some cases, unscrupulous web site owners may establish what appear to be valid login fields on legitimate web pages that typically appear to be owned by well-known companies (this is generally referred to as phishing). As such, web pages may be established which request or require user authentication, but do not implement secure protocols 114. In such cases, if a user provides authentication information, this information may be intercepted and read in the clear.

The determining module 107 of computer system 101 may thus determine for the accessed web page 111 whether any of the user authentication elements (of which there may be multiple) 113 has been implemented without implementing secure protocols 114. The determining module 107 may use a variety of different methods for determining whether secure protocols have been implemented in a web element, as will be explained further below. Once it has been determined that insecure protocols (such as standard hypertext transfer protocol (HTTP)) have been implemented with user authentication elements 113, the warning generation module 108 may generate a warning message 109. The warning message 109 may be displayed to developers who are developing web pages that contain insecure user authentication elements, to end users who are browsing web sites that contain insecure user authentication elements or to users who are implementing applications such as security scanners to determine, from live web traffic data, whether users are accessing web sites that contain insecure user authentication elements. These concepts will be explained further below with regard to methods 200 and 300 of FIGS. 2, 3 and 4, respectively.

Figure 2:
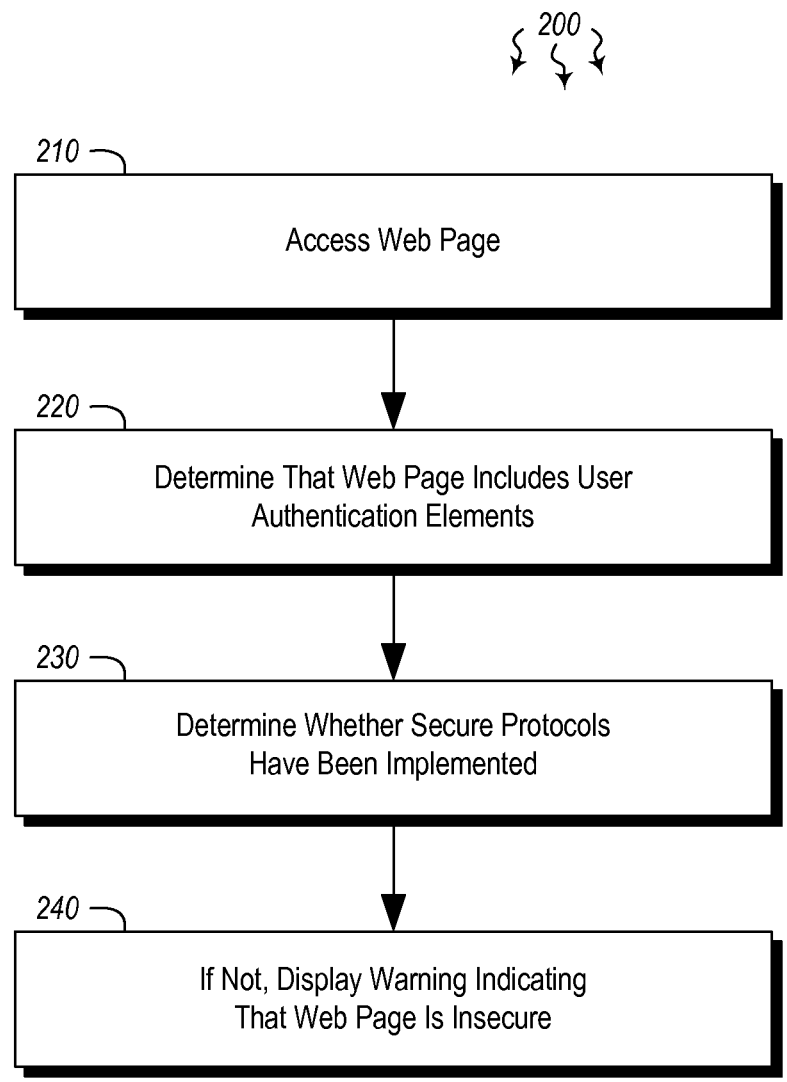
FIG. 2 illustrates a flowchart of an example method for preventing development of insecure web pages.
Figure 3:
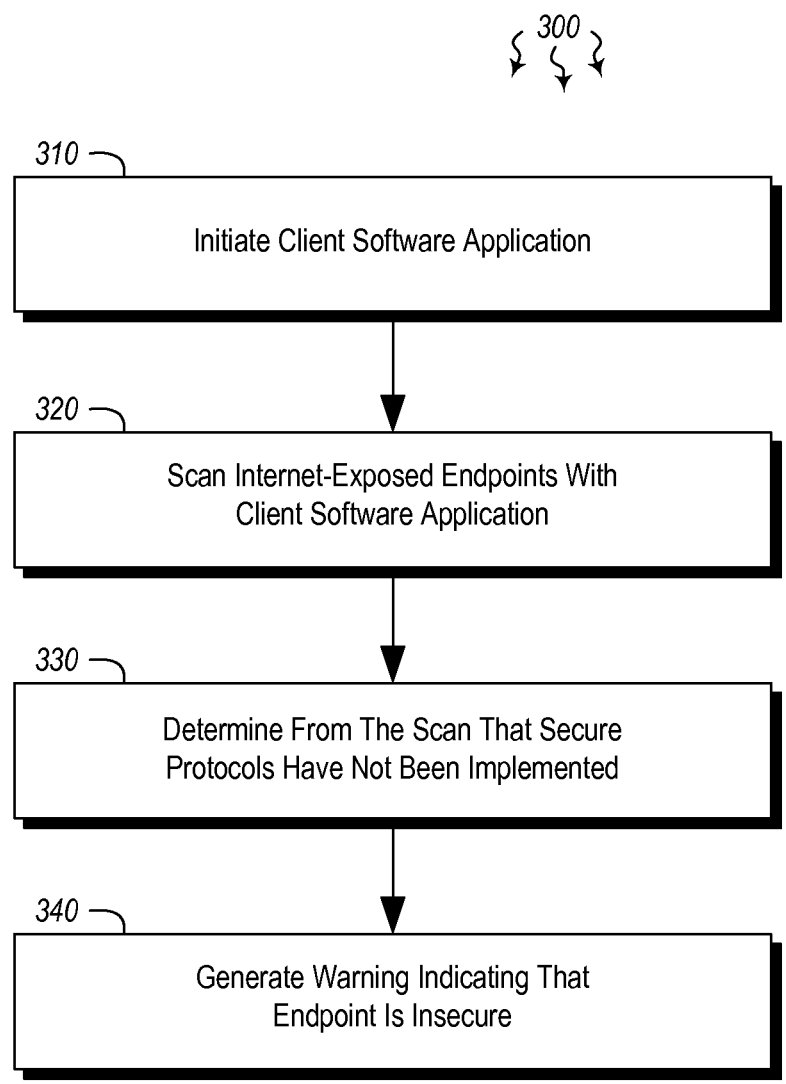
FIG. 3 illustrates a flowchart of an example method for preventing deployment of insecure web pages.
Figure 4:
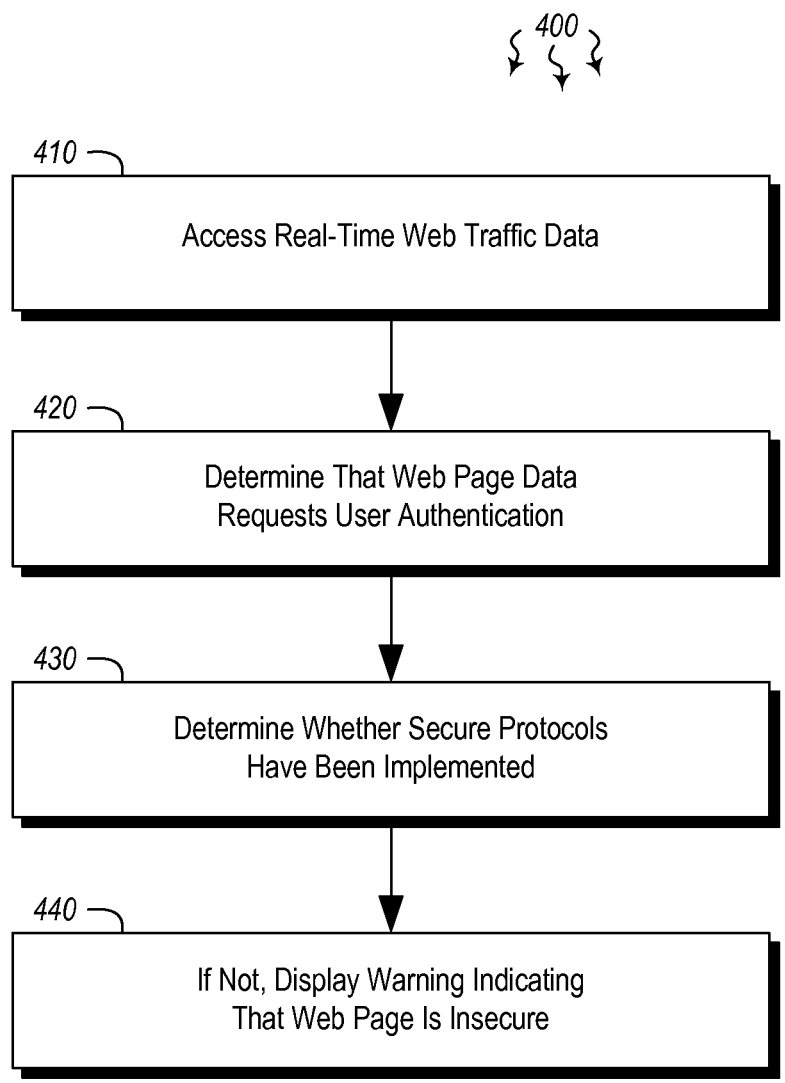
FIG. 4 illustrates a flowchart of an example method for preventing access to insecure web pages.

In view of the systems and architectures described above, methodologies that may be implemented in accordance with the disclosed subject matter will be better appreciated with reference to the flow charts of FIGS. 2, 3 and 4. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for preventing development of insecure web pages. The method 200 will now be described with frequent reference to the components and data of environment 100.

Method 200 includes an act of accessing a web page that includes one or more web elements (act 210). For example, web page accessing module 106 may access web page 111, which itself may be currently under development in an integrated development environment (IDE) 110. The IDE may be any type of development environment, from minimalist types to full-featured, commercial IDEs. The web page accessing module may be part of the IDE or may be separate from the IDE (as shown in FIG. 1). Moreover, it should be noted that any of the modules shown in FIG. 1 may be located on a single computer system, or distributed over multiple different computer systems. The web page includes one or more different web elements 112, some of which may be user authentication elements 113. The user authentication elements may be designed to prompt the user for login credentials. The login credentials may include user name and password, personal identification number (PIN), biometric data (including fingerprints, iris scans, etc.), answers to preselected questions, various forms of tokens or other types of credentials.

Method 200 further includes an act of determining that the web page includes at least one element that requests user authentication (act 220). The determining module 107 may determine, based on various characteristics of the web page 111, that at least one of the web elements 112 is a user authentication element 113. The determining module 107 may look to the web page's underlying code and/or scripts to determine whether user authentication elements are in use. The web page may, for example, include authentication fields in one or more parts of the web page. The determining module 107 may detect these authentication fields by searching through the code for certain specified words that are used in the code to invoke the authentication fields. These words may include "authentication", "password", "user name", "identification", "credentials" or other words which may indicate that at least one of the elements of the web page is requesting user authentication.

Other embodiments may include searching for specified indicators in the web page's underlying code in order to detect authentication fields in the web page. The indicators may include images, function calls, captchas, inclusion of certain code elements or code types, references to third party authentication or user verification services or other indicators. The list of indicators or specified words may be updated to continually include new terms or indicators. Thus, as unscrupulous web site owners change tactics to persuade users to provide login credentials on insecure web pages, the web browsers, IDEs or other software applications looking for the presence of user authentication elements 113 that have not implemented secure protocols 114, will be capable of detecting the new words or other indicators.

Still further, the web browsers, IDEs and other software applications may be configured to search for specified application programming interfaces (APIs) or API calls. These API calls may indicate that a user authentication element 113 is present in the web page. The APIs or API calls may be any type of software code or script that invokes a method or other portion of software functionality. The API calls may, for example, invoke a user authentication element 113. If that web element is implemented without using secure protocols 114, a warning message may be generated. Similarly, the determining module 107 may perform a test to determine whether user authentication elements are being implemented on a web page without secure protocols. The determining module 107 may attempt to load the web page and further load or initiate web elements that are part of the web page 111. If the web page presents a notification indicating that access is denied (and/or that authentication is required), the determining module can further determine whether specified secure protocols have been implemented on the web page (act 230).

If the specified secure protocols have not been implemented on the web page, the computer system 101 may display a warning or error indicating that the web page is insecure (act 240). This warning may be displayed in an integrated development environment (e.g. IDE 110) to developers who are creating web pages within the IDE. It may also be displayed in web browsers, security scanning software applications or in other applications. This warning may warn the user that the web page is insecure, and may take further precautions such as preventing the user from entering their login credentials into the fields, or from submitting already entered credentials.

Additionally or alternatively, the warning message may be displayed in conjunction with the execution of a workflow. For instance, if a web page has been determined to be insecure due to user authentication elements being used without secure protocols, a workflow may be initiated which is configured to obtain a digital certificate. This digital certificate may be provided by a third party provider, or may be generated as a result of the initiated workflow. The certificate may be generated by computer system 101, or by another computer system. This digital certificate may then be used by the computer system 101, upon generation thereby, or up receiving it from the third party provider. In cases where the digital certificate is generated by the computer system 101, it may be generated based on subscription data from the user 104 (e.g. in input data 105). The computer system 101 may, for example, take the subscription information from a user who has subscribed to have a web site hosted by computer system 101. The computer system may use the user's name and/or other credentials when creating the certificate.

Still further, in addition to generating a warning message 109 to be displayed in the IDE, browser or other application, the warning generation module 108 may generate a message that notifies a web page manager that the web page is insecure. For instance, if the web page has been provided by a user (104), a web page manager may be put in place to monitor web pages from that user and/or other users. This manager may thus be notified that the user 104 has submitted a web page for hosting that includes user authentication elements 113, but does not implement secure protocols 114.

In another embodiment, the web page 111 may be sent to a web server with the instructions that the web server is to determine whether the web page includes web elements that request user authentication. If the web server determines that the web page does include such user authentication elements, the web server can further determine whether any secure protocols 114 have been implemented on the web page. If such have not been implemented, the web server can indicate that the web page is insecure and should not be exposed to end users. Thus, a web server or computer system 101 may be used to determine whether a web page under development or in use on the internet is providing user authentication elements without implementing secure protocols. In this manner, end-users and developers may be notified of the insecure page and avoid it or fix it.

Figure 5:
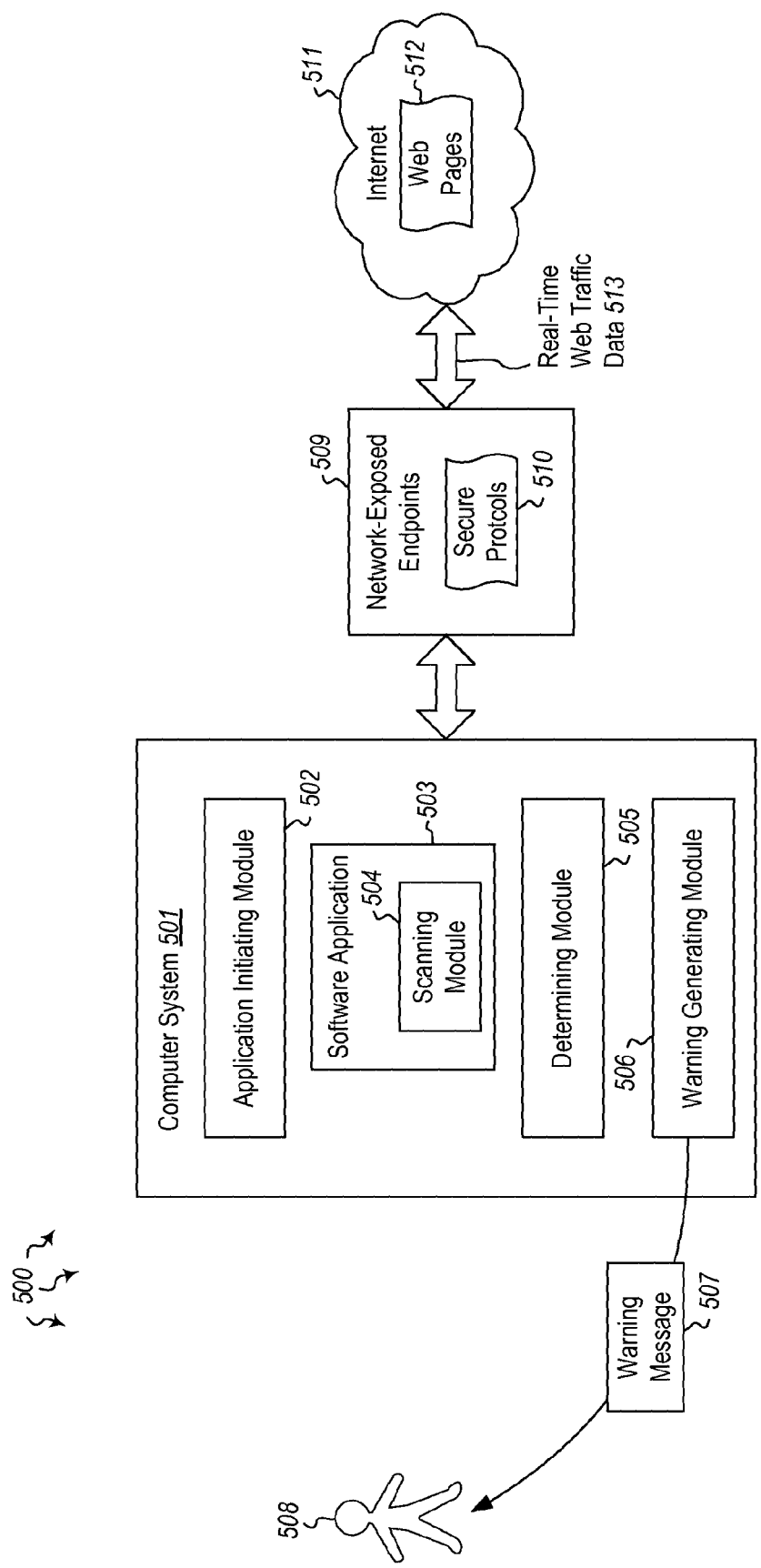
FIG. 5 illustrates a computing architecture in which deployment and access to insecure web pages is prevented.

Turning now to FIG. 3, a flowchart is illustrated of a method 300 for preventing deployment of insecure web pages. The method 300 will now be described with frequent reference to the components and data of environment 500 of FIG. 5.

Method 300 includes an act of initiating a software application configured to determine whether specified secure protocols have been implemented on web pages that require authentication (act 310). For example, application initiating module 502 may be implemented to determine whether secure protocols 510 have been implemented on web pages 512 that require authentication. These web pages may be submitted by users or tenants (508) that wish to have their web pages hosted by computer system 501. Thus, at least in some embodiments, computer system 501 may represent a cloudscale, distributed computer system. Each module therein may thus be located on a different physical computer system, or on the same system. The software application 503 initiated by application initiating module 502 may be configured to implement to the scanning module 504 to scan network-exposed endpoints 509 to determine whether specified secure protocols have been implemented on web pages that require authentication (act 320).

The network-exposed endpoints 509 may be connected to the internet 511 or other networks. These networks may have or provide web pages which are accessible by end users. As such, the network-exposed endpoints 509 should provide web pages that implement secure protocols 510, at least for those web pages that include user authentication elements. Thus, the scanning module 504 of the software application 503 may scan computing nodes, routers, gateways, firewalls or other network-exposed endpoints to determine, at the endpoint level, whether web pages that require authentication are being provided without the implementation of secure protocols 510.

Method 300 further includes an act of determining, from the scan, that secure protocols have not been implemented on at least one network-exposed endpoint (act 330). When the determining module 505 determines, from the scan, that secure protocols 510 have not been implemented on at least one of the network-exposed endpoints 509, the warning generating module 506 generates a warning 507 indicating that the network-exposed endpoint is insecure (act 340). This warning may be sent to network administrators, web page managers and/or end users (e.g. 508) of the web page. The warning 507 may prevent communications with the network-exposed endpoint that provides the insecure web page, or may cause other functionality (such as routers, gateways, individual network cards or ports) to be disabled or partially disabled. In this manner, users are prevented from entering valid login credentials into an insecure web page.

The software application 503 initiated by the application instantiating module 502 may be substantially any type of software application including a client-side application that operates on an end-user's computer system. For instance, the application 503 may be an internet browser. At least in some embodiments, the internet browser can be an older version that is out of date. Even in such browser applications, a scan may be performed to determine whether secure protocols are in use.

In other cases, the software application may be a security scanner. The security scanner may be designed to scan network-exposed endpoints 509 including those exposed to the internet 511 and look for words, indicators, APIs, specific code portions, scripts or other indications that user authentication web elements are being used. If the determining module 505 of computer system 501 determines that secure protocols are not being implemented with such these user authentication web elements, the warning generating module 506 may generate a warning message 507 which notifies end users and/or administrators or web page managers of the insecure page. Still further, as with the embodiment above, a web server may be used to make authentication calls to the network-exposed endpoints. The authentication calls may request authentication credentials and if a login page is provided without secure protocols in use, the warning message 507 will be generated.

Turning now to FIG. 4, a flowchart is illustrated of a method 400 for preventing access to insecure web pages. The method 400 will now be described with frequent reference to the components and data of environment 500 of FIG. 5.

Method 400 includes an act of accessing real-time web traffic data (act 410). Computer system 501 or the network-exposed endpoints 509 themselves may scan real-time web traffic data as it is received from the internet 511 or other networks. The real-time web traffic data may include all kinds of web data including text, images, videos or other multimedia content. The real-time web traffic data may be monitored for user authentication elements that are part of web pages. The determining module 505 determines whether the web page data for at least one identified web page includes user authentication elements (act 420). For those web pages that include user authentication elements (discovered in the various manners described above), the determining module 505 determines whether secure protocols have been implemented (act 430).

If secure protocols have not been implemented on at least one of the web pages, a warning 507 will be displayed indicating that the web page is insecure (act 440). This warning message may be displayed for end users (e.g. 508) in a browser or other application. The warning message may also be sent to the owner of the web page. The warning message 507 may not only indicate that the web page is insecure, but also prevent access to the page. Indeed, the warning message may prevent the user from entering credentials into fields in the web page, or may prevent the user from submitting already-entered credentials, or may prevent the web page from loading entirely.

In some embodiments, the warning generating module 506, in addition to generating the warning message 507, will further initiate a workflow that is configured to determine how the insecure web page can be made secure. The workflow may determine one or more steps that may be taken to implement a secure protocol on the web page. Once the workflow has determined the proper steps to take to make the web page secure, the workflow or computer system 101 or a user (e.g. 508) may perform the determined steps to make the web page secure. After the web page has been made secure by the use of secure protocols 510, the warning may be lifted, and the user may be granted access to the page. Thus, in this manner, insecure web pages can not only be detected but also corrected.

Accordingly, methods, systems and computer program products are provided which prevent development of insecure web pages. Moreover, methods, systems and computer program products are provided which prevent deployment of insecure web pages and prevent access to insecure web pages.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. At a computer system including at least one processor and a memory, a computer-implemented method for preventing development of insecure web pages, the method comprising:

accessing a web page that includes one or more web elements;

determining that the web page includes at least one element that requests user authentication;

as a result of determining that the web page includes at least one element that requests user authentication, determining that one or more specified secure protocols have not been implemented on the web page including at least one element that requests user authentication; and as a result of determining that the one or more specified secure protocols have not been implemented on the web page, displaying a warning or error indicating that the web page is insecure, wherein the warning or error is configured to be displayed when it is determined that one or more web pages include at least one element that requests user authentication when one or more specified secure protocols have not been implemented on the web pages.

2. The method of claim 1, wherein the at least one element that requests user authentication comprises a digital certificate.

3. The method of claim 2, further comprising:
initiating a workflow that is configured to obtain the digital certificate from a third party provider; and
receiving the digital certificate from the third party provider.

4. The method of claim 1, wherein determining that the web page includes at least one element that requests user authentication comprises detecting authentication fields in the web page.

5. The method of claim 4, wherein detecting authentication fields in the web page comprises searching for one or more specified words in the web page's underlying code.

6. The method of claim 4, wherein detecting authentication fields in the web page comprises searching for one or more specified indicators in the web page's underlying code.

7. The method of claim 1, wherein determining that the web page includes at least one element that requests user authentication comprises searching for one or more specified application programming interfaces (APIs) or API calls.

8. The method of claim 1, wherein determining that the web page includes at least one element that requests user authentication comprises testing the web page to determine whether a notification is presented indicating that access is denied.

9. The method of claim 1, further comprising notifying at least one web page manager that the web page is insecure, the web page manager including at least one of a web server operator, a site operator and a cloud service operator.

10. The method of claim 1, further comprising:
providing the web page to at least one web server; and
indicating to the web server that the web server to determine whether the web page includes at least one element that requests user authentication and further determine whether specified secure protocols have been implemented on the web page.

11. A computer program product for implementing a method for preventing deployment of insecure web pages, the computer program product comprising one or more computer-readable storage media devices having stored thereon computer-executable instructions that, when executed by one or more processors of the computing system, cause the computing system to perform the following:
initiating a software application configured to determine whether specified secure protocols have been implemented on web pages that require authentication;
scanning one or more network-exposed endpoints with the initiated software application to determine whether specified secure protocols have been implemented on web pages at the endpoints that require authentication;
determining, from the scan, that secure protocols have not been implemented on at least one network-exposed endpoint; and
generating a warning indicating that the at least one network-exposed endpoint is insecure, wherein the warning or error is configured to be displayed when it is determined that one or more web pages at the endpoints require authentication when one or more secure protocols have not been implemented on the web pages.

12. The computer program product of claim 11, the one or more computer-readable storage media devices having stored thereon computer-executable instructions that, when executed by one or more processors of the computing system, cause the computing system to prevent communications with the network-exposed endpoint that provides the insecure web page.

13. The computer program product of claim 11, wherein the software application comprises an internet browser.

14. The computer program product of claim 11, wherein the software application comprises a security scanner.

15. The computer program product of claim 11, wherein a web server makes one or more authentication calls to the network-exposed endpoint.

16. A computer system comprising the following:
one or more processors;
system memory;
one or more computer-readable storage media having stored thereon computer-executable instructions that, when executed by the one or more processors, cause the computing system to prevent access to insecure web pages, by performing the following:
accessing real-time web traffic data;
determining that web page data for at least one identified web page includes at least one element that requests user authentication;
as a result of determining that the web a e includes at least one element that requests user authentication, determining that one or more specified secure protocols have not been implemented on the identified web page including at least one element that requests user authentication; and
as a result of determining that the one or more specified secure protocols have not been implemented on the web page, displaying a warning indicating that the web page is insecure, wherein the warning or error is configured to be displayed when it is determined that one or more web pages include at least one element that requests user authentication when one or more specified secure protocols have not been implemented on the web pages.

17. The computer system of claim 16, wherein the one or more computer-readable storage media have stored thereon computer-executable instructions that, when executed by the one or more processors, cause the computing system to send a warning message to the owner of the web page.

18. The computer system of claim 16, wherein the one or more computer-readable storage media having stored thereon computer-executable instructions that, when executed by the one or more processors, cause the computing system to prevent access to the insecure web page.

19. The computer system of claim 16, wherein the one or more computer-readable storage media having stored thereon computer-executable instructions that, when executed by the one or more processors cause the computer system to initiate a workflow that is configured to determine w the insecure web page can be made secure.

20. The computer system of claim 19, wherein the one or more computer-readable storage media having stored thereon computer-executable instructions that, when executed by the one or more processors, cause the computing system to perform one or more determined steps to make the web page secure based on the determination indicating how the insecure web page can be made secure.

21. A computer-implemented method performed by a computing system which includes a memory containing computer-executable instructions which, when executed by one or more processors of the computing system, perform a method for detecting a web site that attempts to engage in phishing or that attempts to otherwise obtain unprotected security credentials of a user of the computer system, and if detected, thereafter warns the user, the method comprising:
- at the computer system, a user accessing a web page that includes one or more web elements;
- the computer system determining that the accessed web page includes at least one element that requests user authentication credentials;
- the computer system then determining whether one or more specified secure protocols are provided by the accessed web page which are required for secure transfer of the requested user's authentication credentials; and
- if the computer system detects that the one or more specified secure protocols are not provided by the accessed web page, a warning generation module running at the computer system thereafter displaying a warning to the user that the accessed web page is requesting ser authentication credentials without providing security for the requested user authentication credentials.

* * * * *